(No Model.)

L. A. PIAGET.
DIAMOND TWEEZERS.

No. 573,036.  Patented Dec. 15, 1896.

Witnesses.
Wm. M. Drew
E. C. Crooks.

Inventor.
Louis A. Piaget
By John F. Kerr
atty

UNITED STATES PATENT OFFICE.

LOUIS A. PIAGET, OF PATERSON, NEW JERSEY.

DIAMOND-TWEEZERS.

SPECIFICATION forming part of Letters Patent No. 573,036, dated December 15, 1896.

Application filed November 25, 1895. Serial No. 570,013. (No model.)

*To all whom it may concern:*

Be it known that I, LOUIS A. PIAGET, of the city of Paterson, in the county of Passaic and State of New Jersey, have invented certain new and useful Improvements in Diamond-Tweezers, of which the following is a specification.

In the jewelry trade tweezers or tongs are used for the purpose of picking up diamonds or other stones to transfer them from one place to another or for the purpose of examining them, and it frequently happens that the stone is dropped from the tweezers or tongs while being handled or while one person is handing the tongs to another person.

I am aware that temporary settings for stones for the purpose of exhibiting them in windows or show-cases are used, but the object of my invention is to provide jewel tongs or tweezers adapted to pick up a stone and securely hold it while it is being examined or handed from one person to the other or which may be used in picking up stones and transferring them from one place to another.

The invention consists of the improved jewel tongs or tweezers, which are shown in the accompanying drawings, which form a part of this specification, in which—

Figure 1:
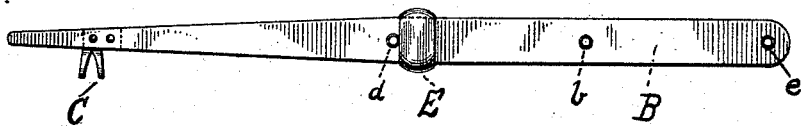
Figure 2:
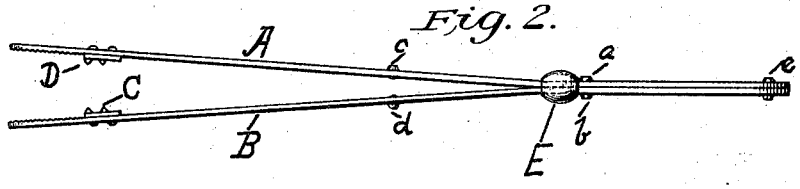
Figure 3:
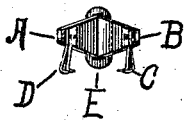

Figure 1 is a view of tweezers, showing them closed. Fig. 2 is a view of tweezers turned edgewise or a top view thereof. Fig. 3 is a view of tweezers when opened, looking at the open end.

The invention consists of tweezers provided with two tongs so constructed that they remain separated or apart from each other at the ends when not in use, said tongs being provided with claws near the ends thereof for the purpose of holding and adapted to hold as an ordinary setting a diamond or other stone, and a fastener consisting of a sliding loop to cause the tongs to come together when it is moved toward the end of the same, so as to securely hold the diamond between the ends of the tongs or in said claws while being examined. Inside of said tongs between the ends thereof and the claws secured to them is a rough file-faced portion which may be used when it is not deemed necessary to use the claws.

By moving the sliding loop toward the handle the blades or tongs are allowed to separate and the diamond or other stone is released.

It is customary for a salesman to pick up a diamond in tweezers now in use and hand them to a customer to be examined, and in so doing the stone is frequently dropped when there is no fastener to hold the blades of the tweezers together.

In the drawings I show the form of fastener which I prefer to hold the blades together. It consists of a sliding loop E, which encircles the tongs and is confined in its movements backward and forward by the stops $a\ b\ c\ d$. The stops $a$ and $b$ are formed by a pivot that passes through both tongs and secures them together. The handle end of the tweezers may be formed by securing the tongs together by the pivot $e$ or in any other appropriate manner. The pivot $c$ is secured to the tong A and the stop or pivot $d$ is secured to the tong B. The tongs A and B are constructed so as to spring apart and separate when the sliding loop E is moved toward the handle to the position shown in Fig. 2, and they are closed and come together when said loop is moved toward the end of the tongs to the position shown in Fig. 1. C and D are the claws or prongs.

I do not confine myself to the manner of constructing the claws C and D, as they may be cut out integral with the tongs or riveted to them or secured in any appropriate manner.

I propose to construct the claws as the claws in ordinary settings are made, so that when the clasp, which consists of a sliding loop, as shown in the drawings, causes the tongs and claws thereon to come together and securely hold a stone or diamond the observer may see how the stone will look when set.

With this description of my invention, what I wish to claim, broadly, is—

As an improved article of manufacture a jeweler's tweezers, having the tongs A and B, the claws C and D secured to said tongs at right angles thereto and near the ends thereof, a sliding loop encircling said tongs and stops secured to said tongs to limit the backward and forward movement of said sliding loop, constructed substantially as shown and described.

LOUIS A. PIAGET.

Witnesses:
WM. M. DREW,
R. EMMET O'BRIEN.